S. Mowry,
Horse Rake.
No. 1303
32307
Patented May. 14, 1861.
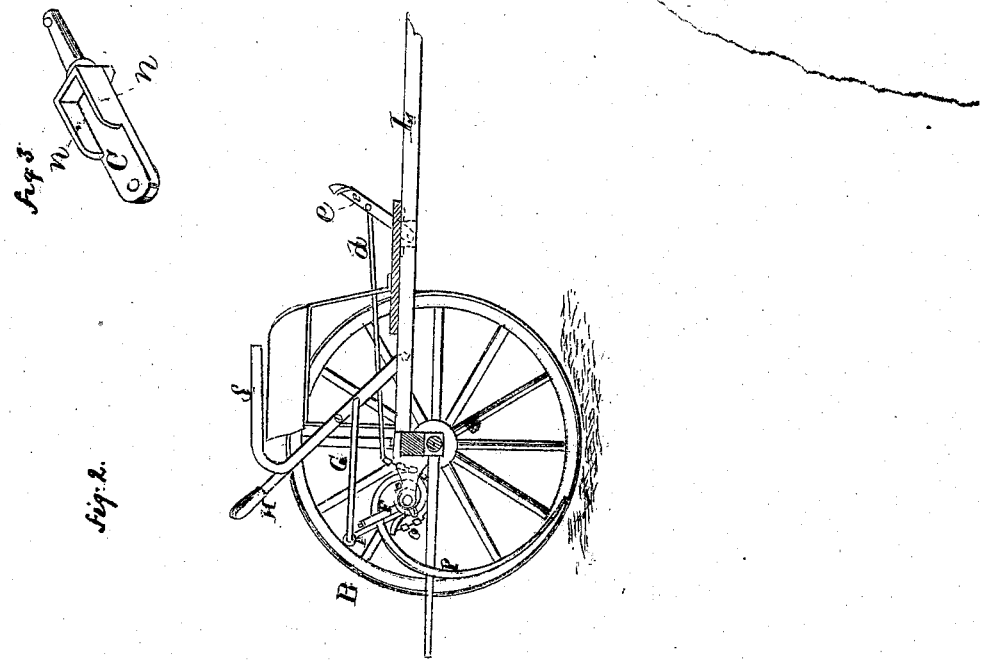
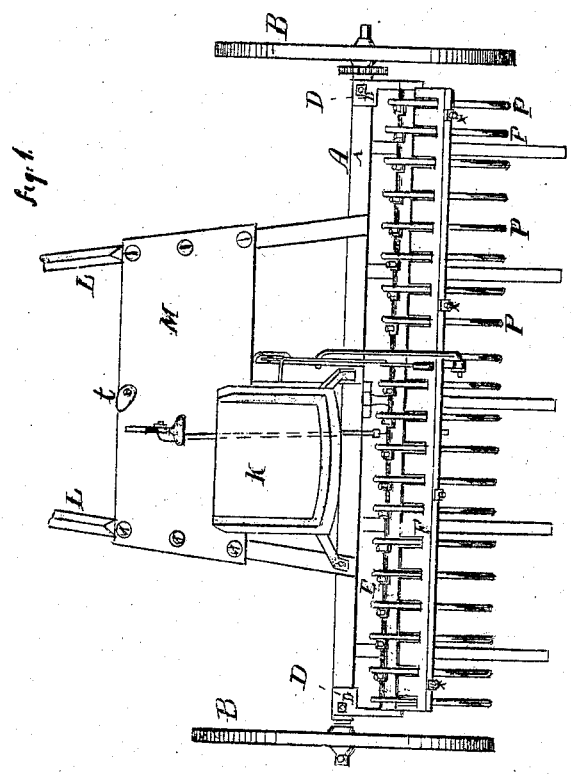
Inventor
S. Mowry
Witnesses
G. M. Alexander
R. R. Yeatman

UNITED STATES PATENT OFFICE.

SAMUEL MOWRY, OF WOMELSDORF, PENNSYLVANIA.

IMPROVEMENT IN HORSE-RAKES.

Specification forming part of Letters Patent No. 32,307, dated May 14, 1861.

*To all whom it may concern:*

Be it known that I, SAMUEL MOWRY, of Womelsdorf, in the county of Berks and State of Pennsylvania, have invented certain new and useful Improvements in Rakes; and I do hereby declare that the following is a full, clear, and exact description of the same, reference being had to the accompanying drawings, and to the letters of reference marked thereon.

The nature of my invention consists in constructing and arranging certain parts of this rake in the manner hereinafter set forth.

In the annexed drawings, Figure 1 represents a plan view of the rake. Fig. 2 is a side elevation. Fig. 3 is a perspective of one end of the axle.

In the figures, A represents the axle of the machine, which is supported upon two wheels, B B. This axle A is made of wood, but is provided with metallic ends C, constructed in the manner represented in Fig. 3. The ends C are provided with a box formed by the sides n n, which receives the ends of the wooden axle, being bolted to the axle in any convenient and permanent manner.

D D represent metallic pieces, which are secured near the ends of the axle, and in which the rake-shaft has its bearings.

E represents the rake-shaft, which is provided with a series of rake-teeth which are secured at a proper distance apart. The teeth P P curve around the shaft E and pass through it, as seen in Fig. 2, and are secured by means of nuts which pass over screws upon the ends of the teeth. The teeth are additionally secured and kept in position by means of staples s, which straddle them, and which are secured in the shaft E.

F represents a board the length or very nearly the length of the shaft E, which is secured firmly to said shaft by means of bolts and nuts, as seen at x x x. This board is provided with a series of openings or slots, through which the rake-teeth pass. The teeth are allowed play in these openings, so that they can spring out and back to their proper positions again. The object of this board is to keep the teeth from bending out of position.

I am aware that metallic staples have been used for the same purpose; but in addition to their being costly and troublesome to keep in place and from bending, so as to prevent the free operation of the teeth, they wear the teeth so much that a set of teeth very rarely last more than one season. This board is cheap, is easily kept in place, and never bends to prevent the free operation of the teeth, and does not wear the teeth away by their constant connection with its sides in raising and lowering the rake. Two arms, a and I, are secured to the rake-shaft. A chain, o, is secured to arm a, and is connected by means of a connecting-rod, d, to the lever e. The chain a passes under the shaft E, and serves to draw the rake down to its work when the machine is in operation. The arm I is connected by a rod, G, to the lever H, and serves the purpose of raising the rake, so as to allow it to discharge when necessary. It will be readily seen that by allowing the lever H to be free the rake may be drawn to its work by pressing against the lever e, and also that as soon as it is desirable to discharge the hay from the rake it may be done by removing the pressure from lever e and applying it to lever H. By means of these two levers and their attachments, the rake may be very easily operated by the driver, who sits upon the seat K.

L L are the thills, and M the platform for the driver's feet, which is secured across the thills, as seen. t is a catch for holding the arm s of lever H.

By means of the end pieces, C, the axle may be made very strong (and yet light) at those points where an axle is likely to break when strain comes upon it. I am enabled by the use of these pieces to use a wooden axle, and therefore a light axle, without danger of its being broken.

Having thus fully described my invention, what I claim as new, and desire to secure by Letters Patent, is—

The combination of the bent arm s and catch t with the levers H and e and their connecting mechanism for operating the rake, when the several parts are arranged for joint operation in the manner described.

In witness that I claim the foregoing I have hereunto set my name this 29th day of January, 1861.

SAMUEL MOWRY.

Witnesses:
C. M. ALEXANDER,
A. A. YEATMAN.